Figure 1:
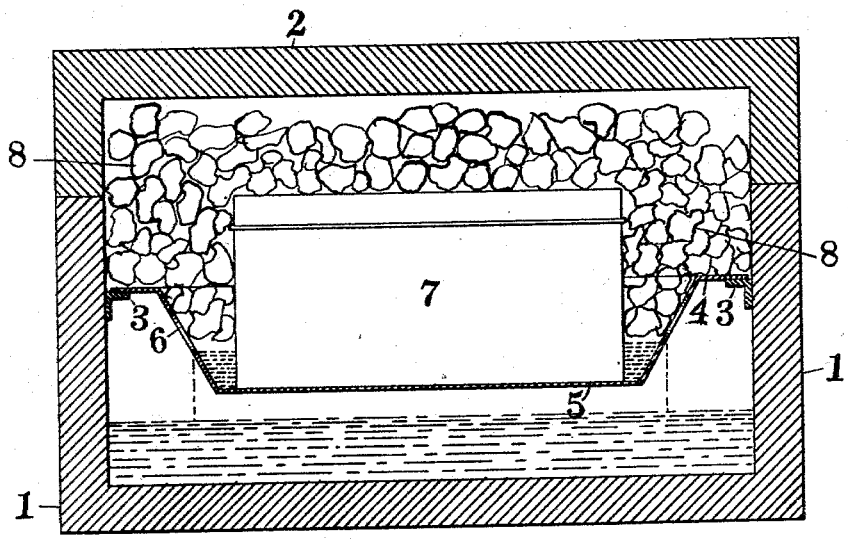

(No Model.)

C. MEINCKE.
ICE CREAM CABINET.

No. 589,568.　　　　　　　　Patented Sept. 7, 1897.

Attest:　　　　　　　　　　　　Inventor.

UNITED STATES PATENT OFFICE.

CARSTEN MEINCKE, OF ELIZABETH, NEW JERSEY.

ICE-CREAM CABINET.

SPECIFICATION forming part of Letters Patent No. 589,568, dated September 7, 1897.

Application filed April 3, 1897. Serial No. 630,549. (No model.)

*To all whom it may concern:*

Be it known that I, CARSTEN MEINCKE, a citizen of the United States, residing at Elizabeth, in the county of Union and State of New Jersey, have invented certain new and useful Improvements in Ice-Cream Cabinets, of which the following is a specification.

This invention relates to an improvement in that class of cabinets or receptacles adapted to maintain the contents of an ice-cream mold inclosed therein in a frozen condition for purposes of delivery by retail dealers or for storage.

The invention has for its object to provide an efficient and inexpensive device of this class in which the mold is subjected to the direct influence of the freezing mixture in the ice-chamber, while the brine from the latter is permitted to drip into a reservoir below the same after having performed its function in abstracting its portion of the heat of the contents of the mold.

Heretofore it has been proposed to provide a box or casing for the freezing mixture into which is projected laterally a closed pocket having no direct communication with the interior of such box or casing, access being afforded for the insertion and removal of an ice-cream mold through the outer end normally closed by a suitable door. While this construction possessed the advantage of effectually preventing injury to the contents of the mold by reason of the penetration of the brine thereto, it obviously lacked efficiency, because the mold contents were not subjected to the direct influence of the freezing mixture through the walls of the mold only, but through the walls of the pocket and the intermediate layer of air in addition. My present improvement is designed to obviate this objection without the loss of the advantages derived from the former construction referred to; and to this end it consists in a casing or receptacle provided at the top with a suitable cover and divided into an upper freezing-chamber and a lower waste-liquid reservoir by a substantially horizontal shelf or partition having a recess or depression in its upper side, with drip-apertures in the side of said recess or depression a sufficient distance above the bottom thereof to retain a portion of the cold liquid in said recess or depression, said shelf or partition serving to sustain the ice-cream mold and the surrounding freezing mixture and to maintain them in a position above the spent liquid in the reservoir.

The provision of a shelf with drip-apertures above the bottom of the receptacle affords a means of separating the "spent" liquid, or that which has already done its work in connection with the surface of the mold, from the solid portion of the freezing mixture, which latter is not therefore permitted to contribute its cold to such spent liquid, as in the form of "tub" or crate now in common use, in which the solid and liquid constituents of the freezing mixture are confined in the same compartment. This construction not only involves a gain in efficiency by subjecting the walls of the mold directly to the action of the freezing mixture and effect the separation of the solid and liquid constituents of the freezing mixture, but serves to prevent the injury of the contents of the mold through the penetration of the brine under its lid by retaining the mold at a point sufficiently above the bottom of the lower reservoir to insure the liquid's never rising to the top of the mold.

By forming the shelf in the receptacle with a depression or cavity having an imperforate bottom and lateral overflow-apertures to receive the mold a sufficient volume of the liquid flowing down the sides of the mold may be retained in contact with its lower portion to be effective in abstracting the heat of the adjacent contents without affecting seriously the surrounding portion of the freezing mixture, and the slightly higher temperature of such liquid in comparison with that of the solid contents of the freezing-chamber is rendered of almost equal effect by reason of its continuous contact with the lower surface of the mold throughout the entire area over which it extends. It will be observed that as the temperature of the liquid collected in the cavity rises it ascends to the top and overflows, being replaced by that running down the sides of the mold produced by the melting of the solid portion of the freezing mixture in contact with the mold.

Figure 2:
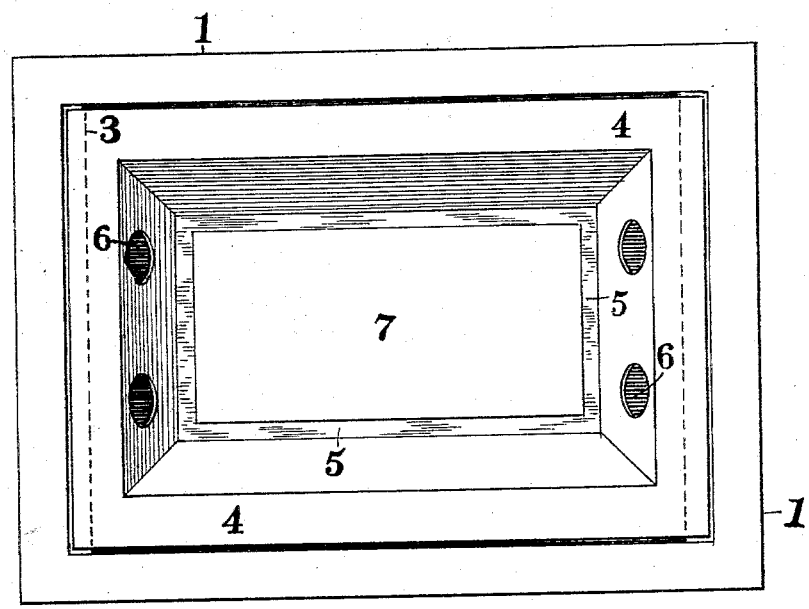

In the drawings annexed, Figure 1 is a vertical section of an apparatus embodying my improvement, and Fig. 2 is a plan of the same with the cover of the freezing-chamber removed to expose the parts within.

The receptacle or casing 1 consists of a rectangular box, preferably of wood, provided with a suitable cover 2 at the top hinged or otherwise fastened thereto. Upon the cleats or brackets 3, secured to the inner walls of the casing, are detachably supported the edges of the shelf 4, having the cavity or depression 5, with lateral drip-holes 6, arranged a little above the bottom, so as to adapt it to retain a small volume of liquid surrounding the lower portion of the mold 7, which is shown resting upon the bottom of the same and packed in a freezing mixture 8, composed of cracked ice and salt. The shelf is made detachable from the box or casing 1 for convenience in cleaning both of such parts of the device.

I consider it preferable in practice to form the sides of the depression 5 nearly perpendicular to the adjacent portions of the shelf in order to inclose a considerable proportion of the surface of the mold for the volume of liquid it will hold between its sides and the surface of the mold.

It has been found by actual test that by the employment of the device shown and described herein a much smaller quantity of the freezing mixture is required to maintain the contents of a given mold in a frozen condition than with others at present in use.

As the purpose for which the present apparatus is designed is such, obviously, as to forbid the discharge of the waste liquid directly from the receptacle as soon as it is formed by the melting of the freezing mixture, provision is made for retaining the same within the receptacle until some convenient time for its removal. Moreover, it is of considerable importance that the wall of the receptacle should not be pierced by a drip-passage, which would serve also to admit the warmer surrounding air and thus impair the effectiveness of the freezing mixture by hastening its melting. In the present construction, therefore, the conditions are all favorable to a high efficiency, which has been attained in actual practice, as already stated.

Having thus set forth the nature of the invention, I claim and desire to secure by Letters Patent—

An ice-cream cabinet comprising a casing or receptacle provided at the top with a suitable cover and divided into an upper freezing-chamber and a lower waste-liquid reservoir by a substantially horizontal shelf or partition having a recess or depression in its upper side with drip-apertures in the side of said recess or depression a sufficient distance above the bottom thereof to retain a portion of the cold liquid in said recess or depression, said shelf or partition serving to sustain the ice-cream mold and the surrounding freezing mixture and to maintain them in a position above the spent liquid in the reservoir, as herein set forth.

In testimony whereof I have hereunto set my hand, this 1st day of April, 1897, in presence of two subscribing witnesses.

CARSTEN MEINCKE.

Witnesses:
ALBERT B. MEINCKE,
HENRY J. MILLER.